(12) United States Patent
De Gaillard

(10) Patent No.: US 6,634,703 B1
(45) Date of Patent: Oct. 21, 2003

(54) DRIVING DEVICE FOR A ROLL-UP SUNSHIELD OF AN AUTOMOBILE ROOF

(75) Inventor: Francois De Gaillard, Mouilleron en Pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/048,600

(22) PCT Filed: Jun. 2, 2000

(86) PCT No.: PCT/EP00/05060

§ 371 (c)(1),
(2), (4) Date: Jun. 10, 2002

(87) PCT Pub. No.: WO01/94139

PCT Pub. Date: Dec. 13, 2001

(51) Int. Cl.$^7$ .................................................. B60J 3/02
(52) U.S. Cl. .................. 296/214; 296/143; 160/265
(58) Field of Search .................. 296/214, 143; 160/265, 274, 310

(56) References Cited

U.S. PATENT DOCUMENTS 5,033,527 A  *  7/1991  Ouvard et al. .............. 160/310

FOREIGN PATENT DOCUMENTS

| DE | 44 24 188 C |   | 12/1995 |            |
|----|-------------|---|---------|------------|
| EP | 478156      | * | 4/1992  | ... 296/214 |
| EP | 0 644 075 A |   | 3/1995  |            |
| FR | 2 667 350 A |   | 4/1992  |            |
| JP | 0269719     | * | 11/1988 | ... 296/214 |

* cited by examiner

Primary Examiner—Dennis H. Pedder
(74) Attorney, Agent, or Firm—Nixon Peabody LLP; David S. Safran

(57) ABSTRACT

A drive device for at least one sunshade intended to darken a surface of a motor vehicle roof. The drive device having a pull element to which the free end of at least one sunshade is attached such that each sunshade can be wound onto a winding roller and also having at least one mounting rod which is mounted with a capacity to swivel with respect to the pull element and to which the free end of at least one sunshade is connected.

5 Claims, 3 Drawing Sheets

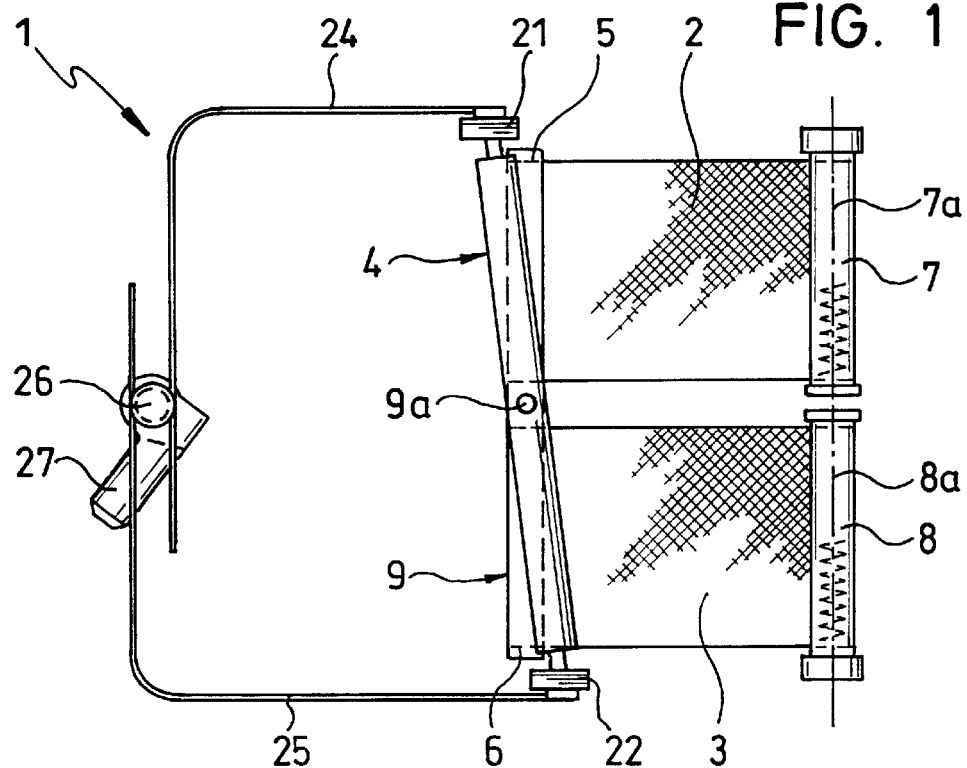
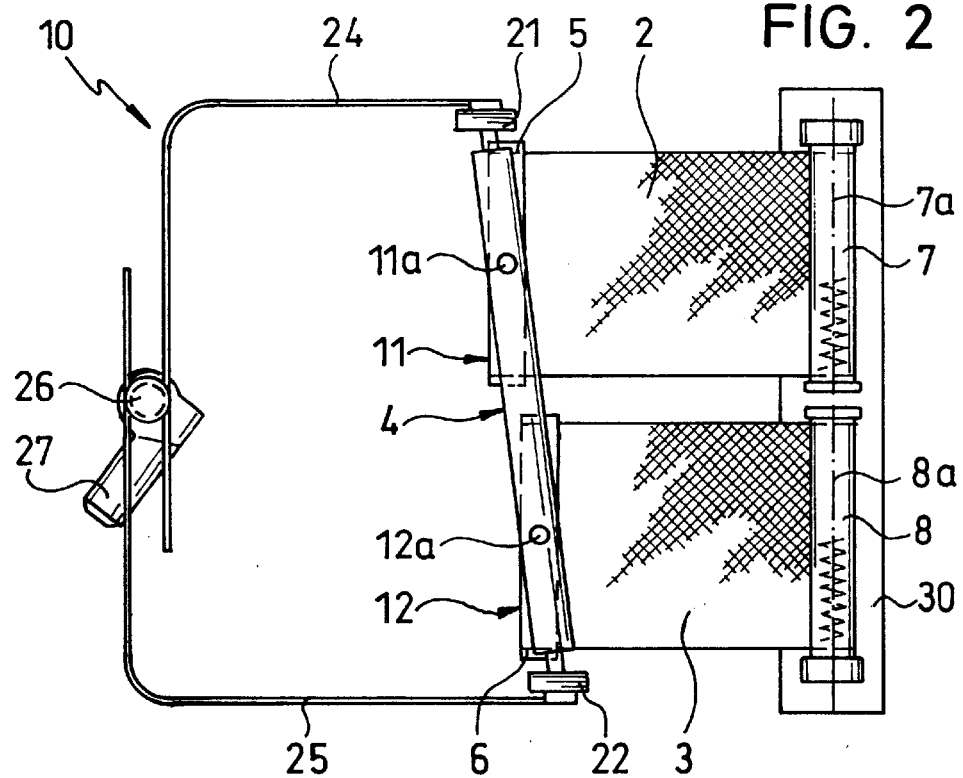

DRIVING DEVICE FOR A ROLL-UP SUNSHIELD OF AN AUTOMOBILE ROOF

BACKGROUND OF THE INVENTION

Field of the Invention

This invention relates to a drive device for at least one sunshade which is intended for the surface of a motor vehicle roof to be darkened. The drive device includes a pull element to which the free end of at least one sunshade is attached, and each sunshade can be wound onto a winding roller.

Description of Related Art

In one such drive means, each winding roller conventionally is mounted on a carrier so that position deviations of the winding rollers can occur.

Generally, the guided ends of the pull element are located in guide rails. In one embodiment in the art, the guided ends are each connected to a drive cable, and the two drive cables are then driven by a pinion which is actuated by a geared motor. This arrangement can result in position deviations in which the pull element is generally not accurately positioned in the transverse plane to the lengthwise axis of the motor vehicle, and is not parallel to the axis of each winding roller and the free end of each sun shade.

This lack of parallelism leads to differences between the stresses exerted on the side edges of the sunshade so that the sunshade, when in the extended position, tends to undulate or warp.

The result also occurs when the pull element is manually actuated using a handle which is located essentially in the middle of the pull element.

SUMMARY OF THE INVENTION

The object of this invention is to avoid the disadvantages of the conventional drive devices and set forth a drive device of the aforementioned type which enables uniform drawing of each sunshade and thus uniform tensioning of the material of each sunshade over its entire width.

This object is achieved in a generic drive device of the invention in which the drive device has at least one mounting rod which is mounted to be capable of swiveling with respect to the pull element and to which the free end of at least one sunshade is attached.

As a result, in the situation in which any lack of parallelism may occur between the pull element and the axis of the winding roller of each sunshade, the mounting rod can swivel relative to the pull element in order to substantially or completely balance this lack of parallelism and to enable as uniform as possible tensioning of the material of each sunshade.

Preferably, for each sunshade there is one mounting rod to which the free end of the sunshade is attached and which is pivotally mounted on the pull element.

Additionally, when the sunshades are positioned in different planes to match the arched shape of the surface of the motor vehicle roof to be darkened, accordingly the pull element is essentially arched such that the free head space in the motor vehicle is less restricted by the drive device, particularly when the motor vehicle roof is substantially arched. Preferably, the arch is formed around the lengthwise axis of the motor vehicle.

In another embodiment, multiple sunshades can extend in different planes in order to match the arched shape of the front and the rear edge of a roof opening holding a movable cover. In this embodiment, the pull element is arched accordingly.

Preferably each mounting rod is supported to be able to swivel around a swiveling axis which is essentially perpendicular to the plane of the corresponding sunshade.

In each of the embodiments of the invention, the surface of the motor vehicle roof to be darkened is independent of the roof construction and can be a transparent roof section, a transparent cover which has been inserted securely into the roof, or a roof opening which can be closed by means of a movable transparent cover, for example, a sliding roof cover.

BRIEF DESCRIPTION OF THE DRAWINGS

FIG. 1 illustrates a schematic top view of a first embodiment of this invention;

FIG. 2 illustrates a view similar to FIG. 1 of another embodiment of this invention;

DETAILED DESCRIPTION OF THE INVENTION

Figure 4:
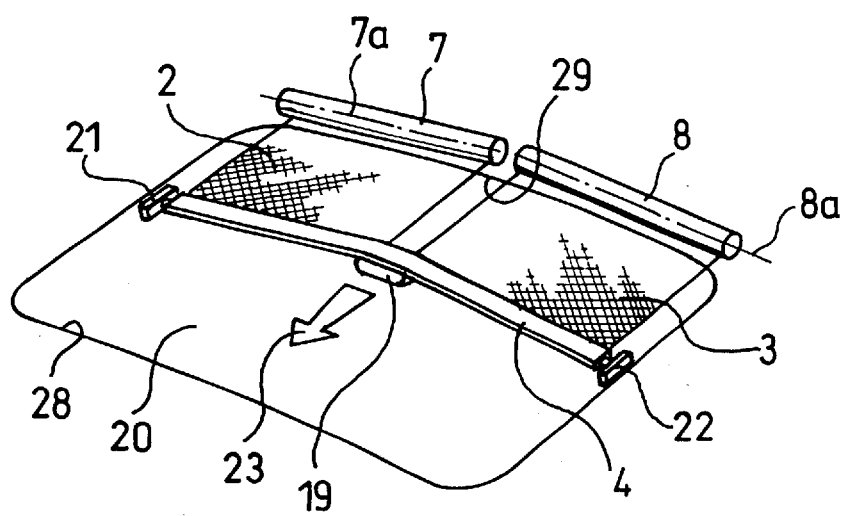
FIG. 4 illustrates a schematic perspective of a conventional drive device in the art.
Figure 5:
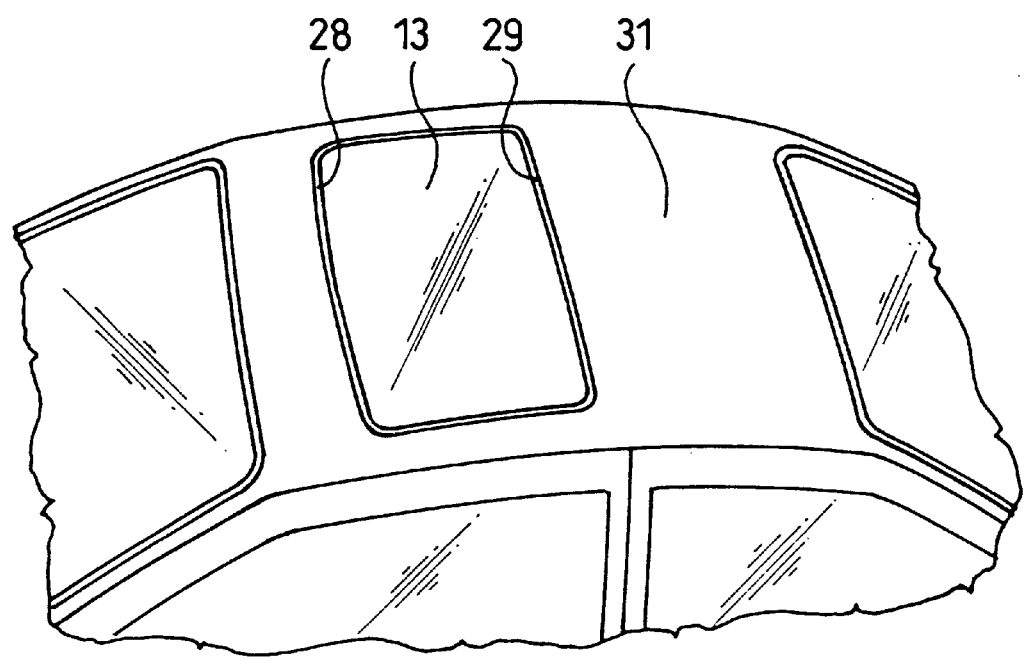
FIG. 5 illustrates a plan view of a roof of a motor vehicle which contains an area to be darkened.

FIG. 4 schematically shows a unit of two sunshades 2, 3 located next to one another and that border one another in order to darken a surface 20, for example a glass cover 13 which may be a sliding roof-glass cover located in the opening of a motor vehicle roof 31 (see FIG. 5). There is a pull element 4, for example a tie rod, positioned in a direction transverse to the surface 20 to be darkened where the free ends of the sunshades 2, 3 are connected to the pull element 4. Each sunshade 2, 3 can be wound on a spring-loaded, pre-tensioned winding roller 7, 8.

Each end of the pull element 4 has a journal 21, 22 which is movably held in a slide rail (not shown) in order to guide the pull element 4 forward in its extension direction (shown by arrow 23) on the motor vehicle when the surface 20 is to be darkened, or in the reverse direction (opposite arrow 23) to guide the pull element to the rear of the motor vehicle when the surface 20 is to be exposed such that each sunshade 2, 3 is wound onto its winding roller 7, 8. In this example, the pull element 4 is manually activated using a handle 19 located essentially in the center of the pull element 4.

In the invention shown in the embodiment of FIG. 1, the drive device 1 for the two sunshades 2, 3 contains two cables 24, 25, which are attached to the journals 21 and 22 and are driven by a pinion 26 which is actuated manually or by a geared motor 27. The drive device 1 includes a mounting rod 9 which is located with a capacity to swivel with respect to the pull element 4 around an axis substantially transverse to the plane of the sunshade(s). For example, the mounting rod 9 is positioned beneath the pull element 4; while the free ends 5, 6 of the two sunshades 2, 3 are connected to the mounting rod 9.

As a result, for any situation in which a lack of parallelism between the pull element 4 and the axes 7a, 8a of the winding rollers 7, 8 occurs, the mounting rod 9 can swivel with reference to the pull element 4 around a swiveling axis 9a in order to at least partially compensate for this lack of parallelism and thereby balancing the tension on each sunshade 2, 3. The free swiveling motion of the mounting rod 9 with reference to the pull element 4 will vary depending on the respective play to be balanced during both the pulling motion of the sunshades 2, 3 and the return and winding motions of the sunshades 2, 3.

In the embodiment of FIG. 2, the drive device 10 comprises mounting rods 11 and 12 for each sunshade 2, 3, respectively, to which the free end 5, 6 of each sunshade 2, 3 is attached. Each mounting rod 11 and 12 is mounted with a capacity to swivel around the respective swiveling axes 11a and 12a on the pull element 4. In this arrangement, each mounting rod 11, 12 can be swiveled such that each shade remains as parallel as possible to the axis 7a, 8a of the corresponding winding roller 7, 8 and the tension is balanced on each sunshade 2, 3.

As is shown schematically in FIG. 4, the sunshades 2, 3 extend generally in different planes in order to adapt to an arch shape of the front and rear edge, 28 and 29 respectively, of the surface 20 to be shaded or the roof opening. The arch shape of the surface 20 to be shaded is arched along the lengthwise axis of the motor vehicle, and the pull element 4 has an essentially corresponding arched shape.

When the embodiment of the drive device shown in FIG. 2 is structured to match this arched shape surface 20, each mounting rod 11, 12 swivels around the swiveling axis 11a and 12a each of which is essentially perpendicular to the plane of the corresponding sunshades 2, 3. The swiveling of the mounting rods 11, 12 makes it possible to balance, in three dimensions, the tensions and any lack of parallelism which may result from the production, installation and guide tolerances of the pull element 4 and of the axes 7a, 8a of the winding rollers 7, 8 mounted on a carrier 30.

Figure 3:
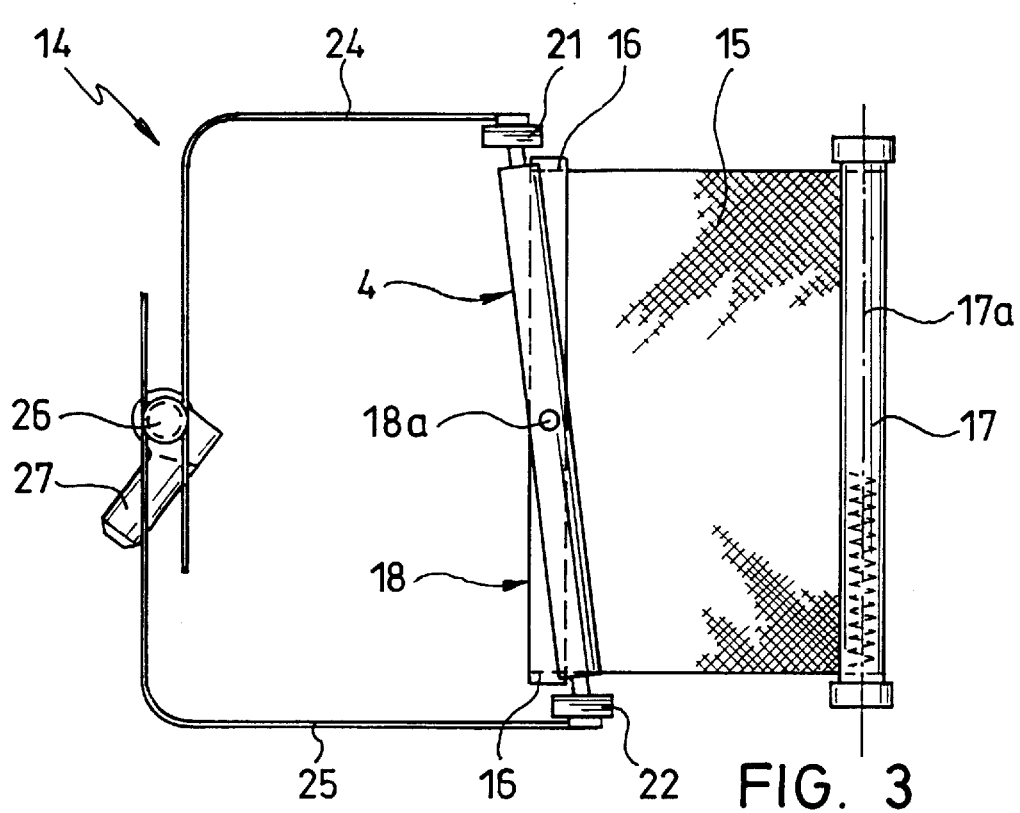
FIG. 3 illustrates a view similar to FIG. 2 of another embodiment of this invention.

In the embodiment shown in FIG. 3, the drive device 14 drives only a single sunshade 15 which can be wound on a spring-loaded winding roller 17 which rotates around an axis 17a. The free end 16 of the sunshade 15 is attached to a mounting rod 18 which is mounted on the pull element 4 to be able to swivel around a swiveling axis 18a. The mounting rod 18 is supported by the pull element 4 and is essentially parallel to the plane of the sunshade 15 and the axis 7a of the winding roller 17.

This invention is not limited to the described embodiments, and numerous changes and modifications thereto can be undertaken without departing from the framework of the invention. For example, three sunshades can be used instead of the above described two sunshades, which is particularly useful in the situation in which the pull element 4 has an arched shape.

What is claimed is:

1. A drive device for at least one sunshade utilized to darken the surface of a motor vehicle roof, comprising:

at least one mounting rod extending along and connected to a free end of the at least one sunshade such that the at least one sunshade can be wound onto a winding roller, an elongate pull element having two transverse ends adapted to receive a pulling force applied at the same time at each of the transverse ends, and wherein the at least one mounting rod is pivotally mounted on the pull element such that the pull element is capable of swiveling around a swiveling axis which is essentially perpendicular to a plane of the sunshade.

2. Drive device as set forth claim 1, wherein multiple sunshades are provided for darkening the surface of a motor vehicle roof such that a respective mounting rod is attached to the free end of each sunshade and wherein each of the respective mounting rods is pivotally mounted on the pull element.

3. Drive device as set forth claim 2, wherein the sunshades extend in different planes and are matched to an arched shape of the surface of the motor vehicle roof to be darkened, and wherein the pull element is configured to match the arched shape of the surface of the motor vehicle roof.

4. Drive device as set forth claim 2, wherein the sunshades extend in different planes and are matched to an arched shape of a front and a rear edge of a roof opening for supporting a movable cover, and wherein the pull element is configured to match the arched shape.

5. Drive device as set forth claim 1, wherein said swiveling axis is positioned at approximately a center of an axial length of said at least one mounting rod.

* * * * *